United States Patent
Hong et al.

(10) Patent No.: US 12,452,329 B2
(45) Date of Patent: Oct. 21, 2025

(54) THIRD PARTY APPLICATION CONTROL OF A CLIENT

(71) Applicant: Zoom Communications, Inc., San Jose, CA (US)

(72) Inventors: Karen Kuei Ren Hong, San Jose, CA (US); Haibing Xu, Milpitas, CA (US); Dan Yang, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/728,562

(22) Filed: Apr. 25, 2022

(65) Prior Publication Data

US 2023/0344893 A1    Oct. 26, 2023

(51) Int. Cl.
*H04L 29/06*    (2006.01)
*H04L 12/58*    (2006.01)
*H04L 12/66*    (2006.01)
*H04L 29/08*    (2006.01)
*H04L 65/1045*    (2022.01)
*H04L 65/1055*    (2022.01)
*H04L 67/025*    (2022.01)
*H04M 3/42*    (2006.01)
(Continued)

(52) U.S. Cl.
CPC ........ *H04L 67/025* (2013.01); *H04L 65/1045* (2022.05); *H04L 65/1055* (2022.05); *H04M 3/42314* (2013.01); *H04M 7/0024* (2013.01)

(58) Field of Classification Search
CPC .............. H04L 67/025; H04L 65/1045; H04L 65/1055; H04M 3/42314; H04M 7/0024

USPC ......................................................... 709/217
See application file for complete search history.

(56) References Cited

U.S. PATENT DOCUMENTS 6,571,094 B1 *   5/2003   Begeja .................... H04W 4/16
                                                    455/414.1
6,614,781 B1 *   9/2003   Elliott ................... H04L 65/765
                                                    370/352

(Continued)

FOREIGN PATENT DOCUMENTS

CN    107959761 B    6/2020
CN    115767834 A    3/2023
(Continued)

OTHER PUBLICATIONS

International Search Report and Written Opinion mailed on Aug. 23, 2022 in corresponding PCT Application No. PCT/US2022/024739.
(Continued)

*Primary Examiner* — Umar Cheema
*Assistant Examiner* — Golam Mahmud
(74) *Attorney, Agent, or Firm* — Young Basile Hanlon & MacFarlane, P.C.

(57) ABSTRACT

A third party application is used to control a client over a software platform. The third party application sends a control command to a microservice of the software platform. The microservice generates an event socket command based on the control command. The microservice transmits the event socket command to a private branch exchange (PBX) server of the software platform over a transmission control protocol (TCP) connection. The PBX server transmits the event socket command to the client to perform the function based on a binding status that indicates a binding between the third party application and the client.

20 Claims, 8 Drawing Sheets

(51) Int. Cl.
*H04M 3/51* (2006.01)
*H04M 7/00* (2006.01)

(56) References Cited

U.S. PATENT DOCUMENTS

| | | | |
|---|---|---|---|
| 8,456,507 B1 | 6/2013 | Mallappa et al. | |
| 8,582,565 B1 | 11/2013 | Morsy et al. | |
| 8,774,370 B2* | 7/2014 | Krivorot | H04M 3/42348 |
| | | | 379/90.01 |
| 8,934,382 B2 | 1/2015 | Rodman et al. | |
| 9,119,136 B2 | 8/2015 | Venkatachalam et al. | |
| 9,172,766 B2* | 10/2015 | Narasimhan | H04L 43/00 |
| 9,300,205 B2 | 3/2016 | Matsui | |
| 9,680,687 B2 | 6/2017 | Chappelle et al. | |
| 10,063,461 B2* | 8/2018 | Tarricone | H04L 65/102 |
| 10,291,597 B2 | 5/2019 | Li et al. | |
| 10,348,902 B1* | 7/2019 | Liu | H04M 3/5233 |
| 10,467,426 B1 | 11/2019 | Esposito et al. | |
| 10,516,705 B2 | 12/2019 | Barjonas et al. | |
| 10,645,088 B1 | 5/2020 | Yanes et al. | |
| 10,834,147 B1 | 11/2020 | Wehrung et al. | |
| 11,233,870 B1* | 1/2022 | Gupta | H04L 63/102 |
| 11,889,028 B2 | 1/2024 | Hong et al. | |
| 11,916,979 B2* | 2/2024 | Hong | H04L 65/1063 |
| 2003/0137959 A1 | 7/2003 | Nebiker et al. | |
| 2003/0137991 A1* | 7/2003 | Doshi | H04L 12/66 |
| | | | 370/466 |
| 2003/0152209 A1* | 8/2003 | Andreason | H04M 3/54 |
| | | | 379/211.01 |
| 2004/0001479 A1 | 1/2004 | Pounds et al. | |
| 2004/0004942 A1 | 1/2004 | Nebiker et al. | |
| 2005/0138183 A1 | 6/2005 | O'Rourke et al. | |
| 2006/0013201 A1 | 1/2006 | Bettis et al. | |
| 2007/0248221 A1* | 10/2007 | Chatterjee | H04M 3/42314 |
| | | | 379/211.02 |
| 2007/0250567 A1 | 10/2007 | Graham et al. | |
| 2007/0283142 A1 | 12/2007 | Milstein et al. | |
| 2008/0175230 A1 | 7/2008 | Brand et al. | |
| 2008/0194244 A1 | 8/2008 | Chen et al. | |
| 2008/0219223 A1 | 9/2008 | Bienas et al. | |
| 2008/0219240 A1 | 9/2008 | Dylag et al. | |
| 2008/0232362 A1 | 9/2008 | Miyajima et al. | |
| 2011/0164744 A1 | 7/2011 | Olshansky et al. | |
| 2011/0182281 A1 | 7/2011 | Siddique et al. | |
| 2012/0257566 A1 | 10/2012 | Le et al. | |
| 2013/0227149 A1 | 8/2013 | Athlur et al. | |
| 2014/0029474 A1 | 1/2014 | Bhagavatula et al. | |
| 2014/0089143 A1* | 3/2014 | Dione | G06K 19/0723 |
| | | | 705/26.61 |
| 2014/0218517 A1 | 8/2014 | Kim et al. | |
| 2014/0270130 A1 | 9/2014 | Casalaina et al. | |
| 2014/0313998 A1* | 10/2014 | Sorescu | H04M 7/0057 |
| | | | 370/329 |
| 2014/0324527 A1* | 10/2014 | Kulkarni | G06Q 30/0261 |
| | | | 705/7.29 |
| 2015/0032809 A1 | 1/2015 | Xie et al. | |
| 2015/0244979 A1 | 8/2015 | Andrada et al. | |
| 2015/0358580 A1 | 12/2015 | Zhou et al. | |
| 2016/0072955 A1 | 3/2016 | Barkan | |
| 2016/0095141 A1 | 3/2016 | Ma et al. | |
| 2016/0142591 A1 | 5/2016 | Modai et al. | |
| 2016/0205348 A1 | 7/2016 | Yang et al. | |
| 2016/0294786 A1 | 10/2016 | Marquez Mendoza et al. | |
| 2016/0301743 A1* | 10/2016 | Zhang | G06Q 50/01 |
| 2016/0323863 A1 | 11/2016 | Park et al. | |
| 2017/0064572 A1 | 3/2017 | Subramanian et al. | |
| 2017/0180484 A1 | 6/2017 | Asveren et al. | |
| 2017/0237986 A1 | 8/2017 | Choi et al. | |
| 2018/0077260 A1 | 3/2018 | Faltyn et al. | |
| 2019/0082477 A1* | 3/2019 | Burton | F16M 13/022 |
| 2019/0102049 A1 | 4/2019 | Anzures et al. | |
| 2019/0141096 A1 | 5/2019 | Rist et al. | |
| 2019/0245895 A1 | 8/2019 | Balasaygun et al. | |
| 2020/0204538 A1 | 6/2020 | Friel | |
| 2020/0220977 A1 | 7/2020 | Ravichandran | |
| 2020/0252765 A1 | 8/2020 | Baker et al. | |
| 2020/0327240 A1* | 10/2020 | Zou | G06F 16/284 |
| 2021/0218836 A1 | 7/2021 | Alameh et al. | |
| 2021/0377345 A1* | 12/2021 | Li | H04L 67/141 |

FOREIGN PATENT DOCUMENTS

| | | |
|---|---|---|
| EP | 1551164 A2 | 7/2005 |
| EP | 1968334 A2 | 9/2008 |
| EP | 2503768 A1 | 9/2012 |
| EP | 3249940 | 11/2017 |
| WO | 2022231852 A1 | 11/2022 |

OTHER PUBLICATIONS

International Search Report and Written Opinion mailed on Jul. 4, 2023 in corresponding PCT Application No. PCT/US2023/0190176.

How Does A Bluetooth Headset Work? From Jabra GN Website: https://www.jabra.com/fq/how-does-bluetooth-headset-work#:-:text=A%20Bluetooth%C2%AE%20device%20works,smartphones%2C%20laptops%20portable%20speakers. (Year: 2023).

European Office Action mailed Mar. 28, 2025 in corresponding European Application No. 22722921.8.

* cited by examiner

THIRD PARTY APPLICATION CONTROL OF A CLIENT

FIELD

This disclosure relates to third party application control of a client over a software platform.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
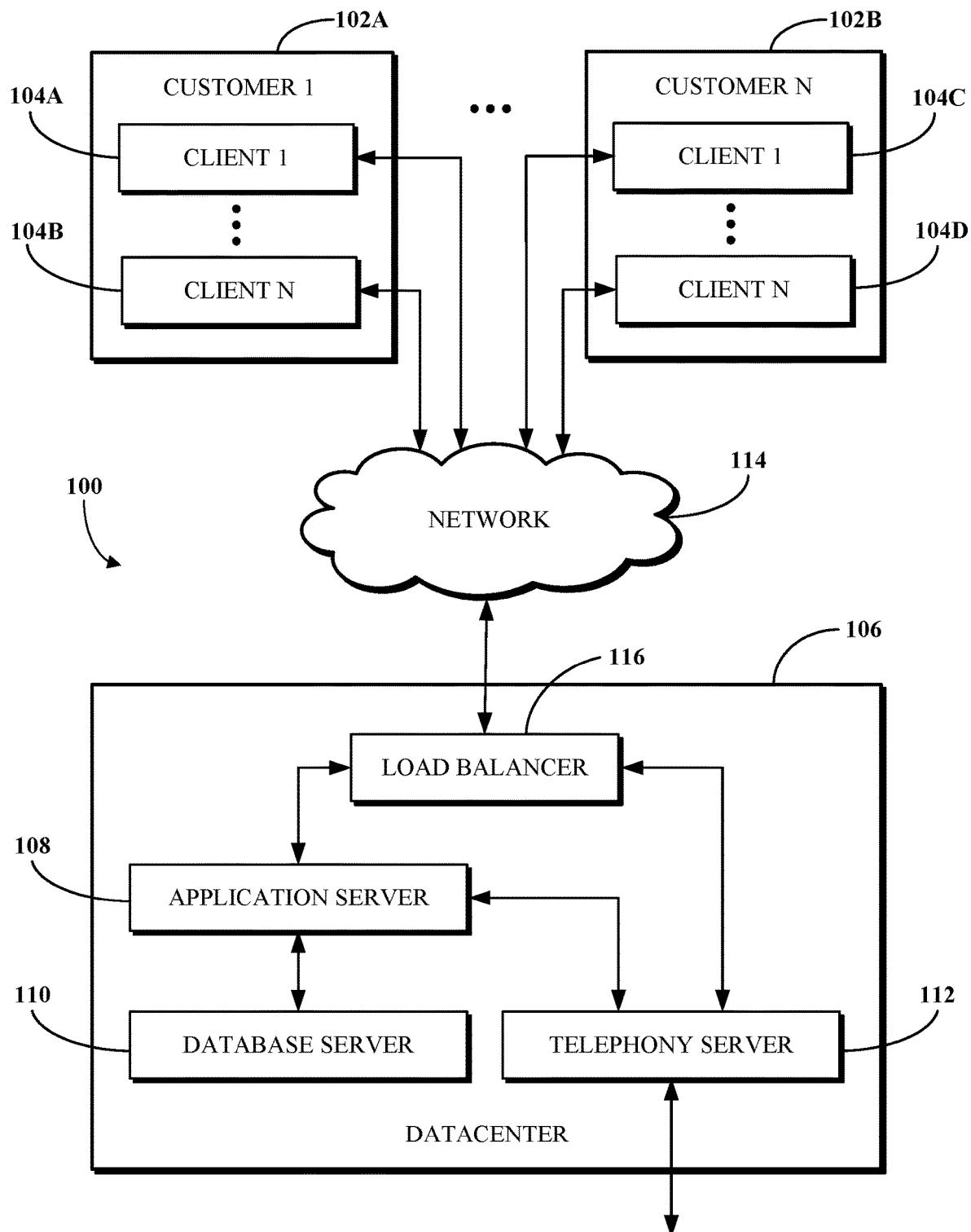
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

UCaaS platforms can provide integrated telephony services for use with devices usable for telephone calls. Examples of devices which are usable for telephone calls include desk phones, mobile phones, conference room devices, and computing devices running softphone applications. Some platform users may prefer the audio quality of a desk phone over that of other devices; however, desk phones typically have limited features (e.g., limited search capabilities, complicated menu structures, and an awkward input interface of condensed keypads that makes searching for a contact difficult) and users may prefer the more robust features that a third party application operated external to the UCaaS platform, such as a customer relationship management (CRM) application, can offer. A user may prefer initiating telephone calls using a CRM since the CRM may be a central part of the user's workflow, and switching between the CRM and a desk phone to place a telephone call is inconvenient and inefficient. In addition, the CRM provides an interface to efficiently search contacts, review relevant information of a given contact, and review a contact history of the given contact (e.g., a summary of past communications with the given contact).

Typical UCaaS platforms are not configured to communicate with third party application systems external to the UCaaS platform and thus cannot enable control of a device on the UCaaS platform to be directly controlled by a third party application. Currently, to leverage features of a third party application, users of integrated telephony services of a UCaaS platform must switch between the third party application and a UCaaS client interface to make and receive calls on a desk phone or other device directly from the third party application; however, this is undesirable since the switching back-and-forth causes an interruption of the user's workflow, which results in frustration and lost productivity. These users may prefer to make and receive calls on a desk phone directly from the third party application, however the differences in technologies used to implement the desk phone and the system implementing the third party application generally cause them to not integrate.

Implementations of this disclosure address problems such as these by implementing a shared control mode for third party applications to integrate the third party applications with clients used with a software platform, for example, a UCaaS platform. A third party application may refer to an application developed by one vendor that is compatible with software of another vendor. A shared control mode is a feature that can be implemented to enable a third party application control one or more functions of another device. For example, the shared control mode can enable a user to make and receive calls from a third party application of their choice via a UCaaS client interface, while being logged into another device, such as a desk phone, for example, with the same extension, and thus without having to switch away from that UCaaS client interface. With the shared control mode, the UCaaS platform is configured to communicate with the third party application, for example, using an application programming interface (API) associated with that third party application, to enable a user to control the function of their desk phone or other device using the third party application. Functions may include, and are not limited to, click-to-call (i.e., click on a name in the CRM to dial), call transfer, call on hold, volume control, mute, and add/merge a call. The user can also leverage these desk phone controls to control audio output of a conference (e.g., a video conference) through the desk phone using the third party application.

To describe some implementations in greater detail, reference is first made to examples of hardware and software structures used to implement a third party application control of a client. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
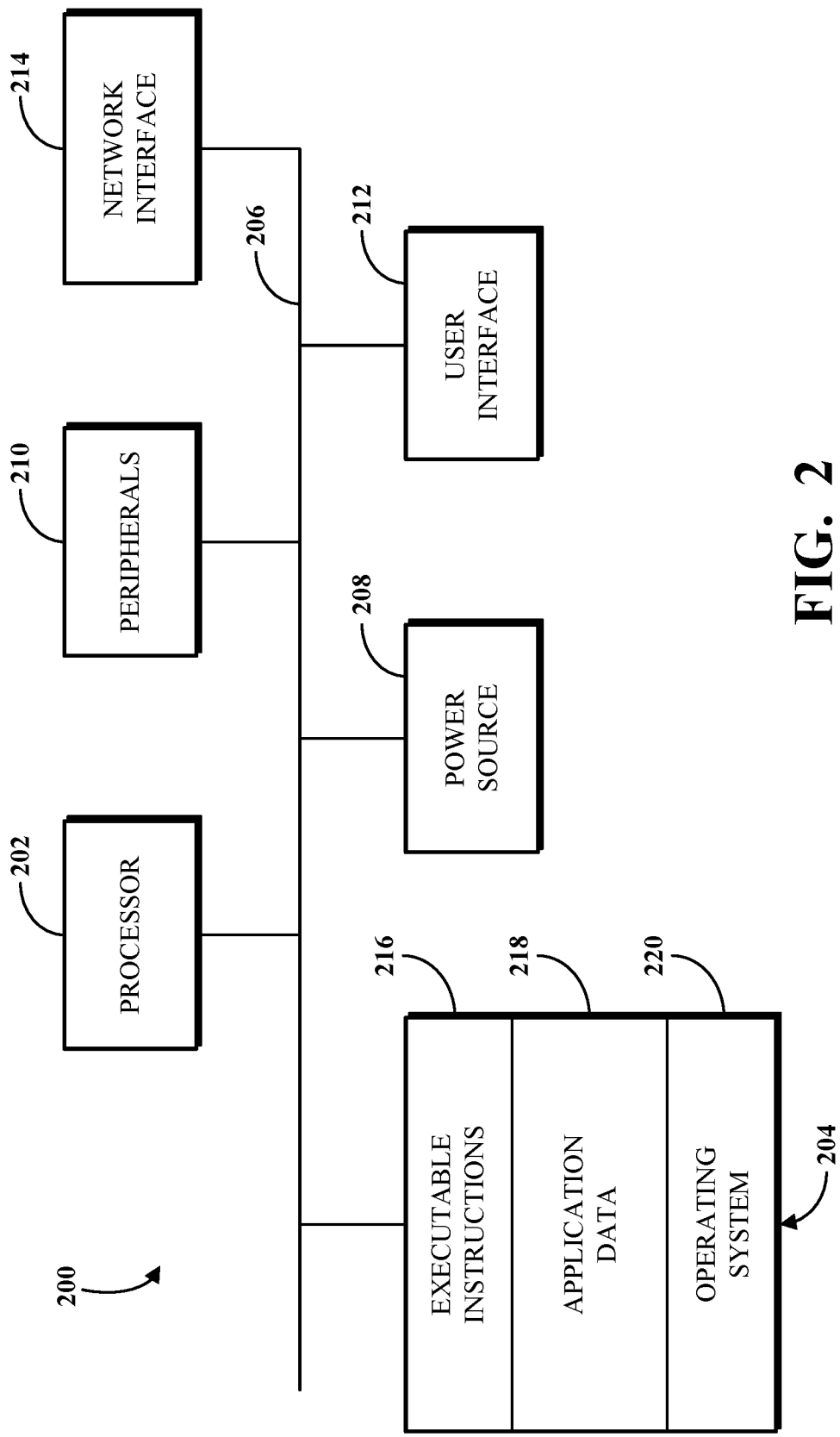
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
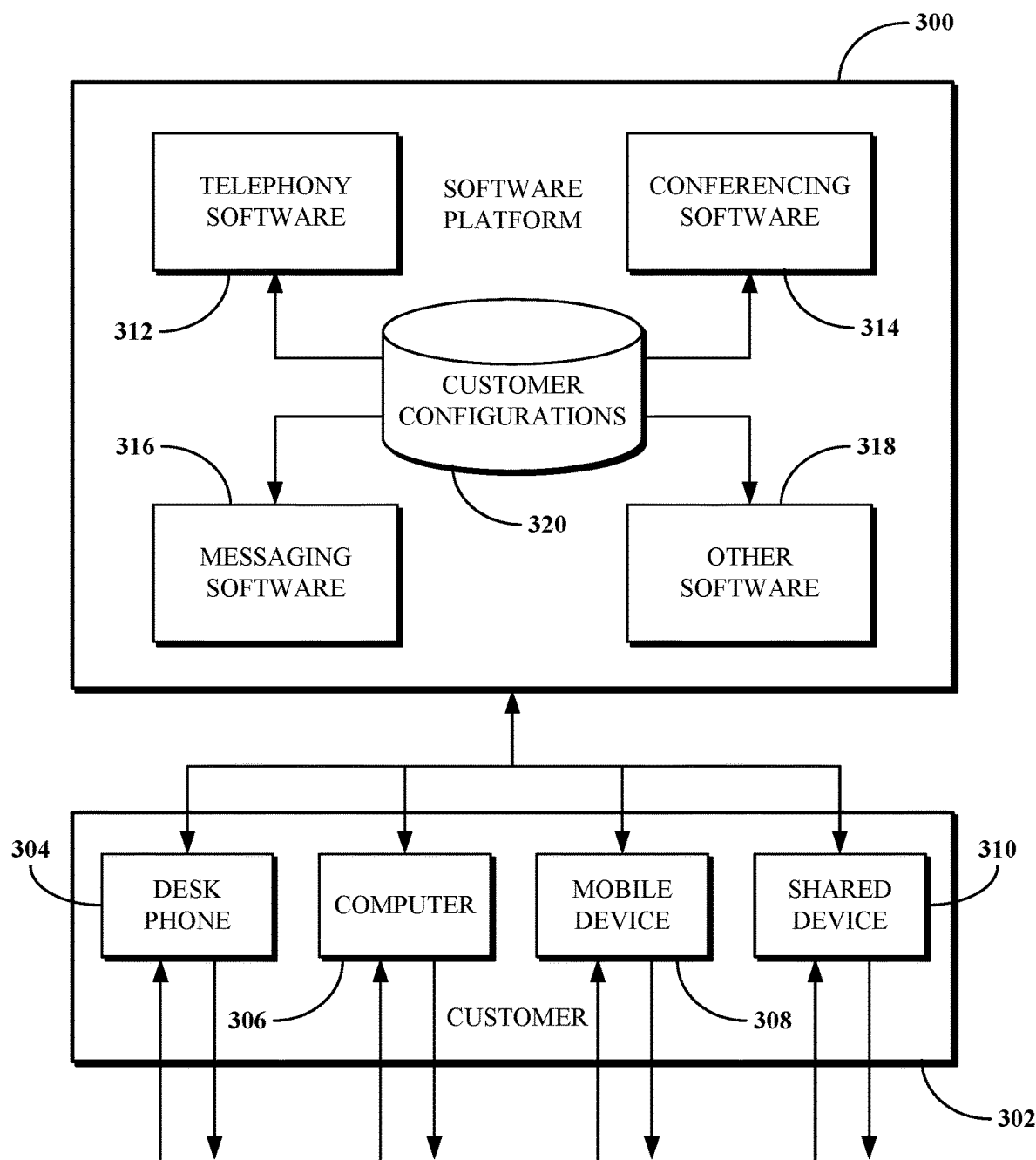
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include third party integration software that enables third party application control of a device used with the software platform 300, for example, one of the clients 304 through 310.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
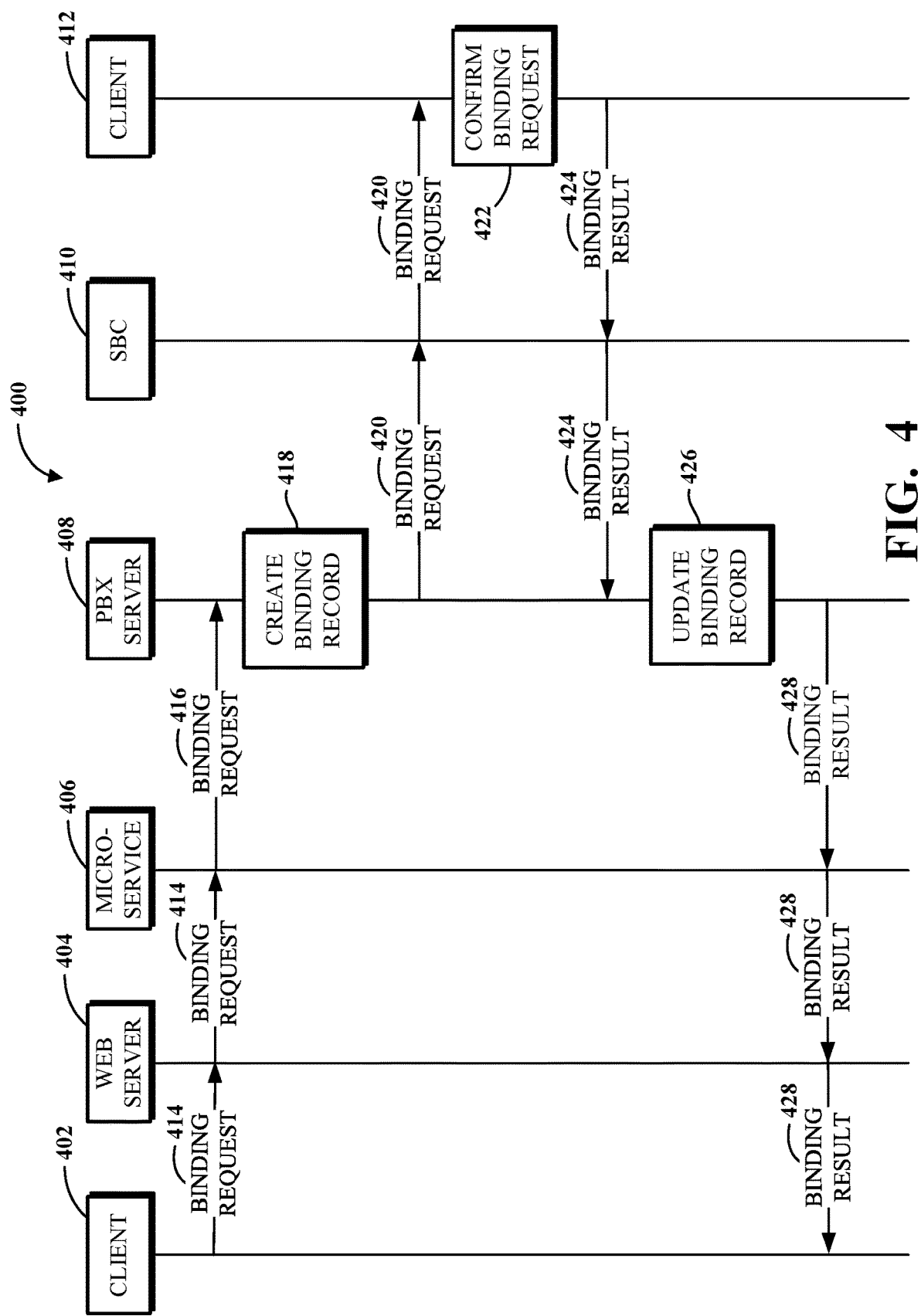
FIG. 4 is a block diagram of an example of a system configured to perform a binding operation to enable third party application control of a client.

FIG. 4 is a block diagram of an example of a system 400 configured to perform a binding operation to enable third party application control of a client. The system 400 includes a client 402, a web server 404, a microservice 406, a PBX server 408, an SBC 410, and a client 412. The client 402 may be a client or a non-client application such as a third party application, and the client 412 may be a client application or a client device, such as any one of the clients 304 through 310 shown in FIG. 3. Example third party applications may include, and are not limited to, a CRM application, a social media application, or a messaging application.

To enable the third party application control of a client, the system 400 performs a binding operation to bind the client 402 to the client 412. In this example, the third party application of the client 402 may be a controller application and the client 412 may be a controlled device such that the client 402 can control one or more functions of the client 412. The binding is an association between the client 402 and the client 412 based on a user account or user extension. In some examples, there may be no direct wired connection between the client 402 and the client 412. For example, the client 402 and the client 412 may be wirelessly bound when they are both logged into the same user account or share the same user extension. The binding may enable a shared (e.g., bi-directional) control such that the client 402 can control one or more functions of the client 412 and the client 412 can control one or more functions of the client 402. In some cases, the one or more functions of the client 412 which can be controlled by the client 402 may be the same as the one or more functions of the client 402 which can be controlled by the client 412. In other cases, the one or more functions of the client 412 which can be controlled by the client 402 may be different from the one or more functions of the client 402 which can be controlled by the client 412.

As shown in FIG. 4, the client 402 is configured to transmit a binding request 414, which is or otherwise includes a request to create an association between client 402 and client 412 (e.g., without requiring or using a direct wired connection between client 402 and client 412). The binding request 414 may be included in a header of a hypertext transfer protocol secure (HTTPS) message, such as an HTTPS request. The header of the HTTPS message may also include a request identifier (ID), an action command, a controller device ID, a controlled device ID, a controller application ID, a controlled application ID, an account ID, an extension ID, an extension domain, a manufacturer name, a timestamp, or any combination thereof. The request ID may be an alpha-numeric string that is used to identify the binding request. The action command may be an instruction or a command to perform an action associated with a function of another client or client device. The controller device ID may be an address or an alpha-numeric string that is used to identify the client device that is transmitting the action command to control a function of another client or client device. The controlled device ID may be an address or an alpha-numeric string that is used to identify the client device to be controlled by another client or client device. The controller application ID may be an address or an alpha-numeric string that is used to identify the client application that is transmitting the action command to control a function of another client or client device. The controlled application ID may be an address or an alpha-numeric string that is used to identify the client application to be controlled by another client or client device. The account ID may be an alpha-numeric string associated with a registration name of a user account. The extension ID may be a numeric representation of a telephony extension associated with the user account. The extension domain may be a domain name associated with the telephony extension. The manufacturer name may be the name of the manufacturer of the device transmitting the binding request. The timestamp may be an indication of the time that the binding request was transmitted.

The web server 404 is configured to receive the binding request 414 and forward the binding request 414 to the microservice 406. The microservice 406 may include one or more applications running on a server, such as the application server 108 shown in FIG. 1. The server may, for example, be an nginx-based server, such as OpenResty, that supports a variety of different clients and integrates with other applications via either web services or a message broker. The nginx-based server may, for example, be configured to run Lua scripts using a LuaJIT engine. The microservice 406 is configured to receive the binding request 414 and execute business logic based on the binding request 414 to generate a binding request 416 using an event socket library (ESL). Executing business logic may include transmitting binding requests to multiple PBX servers for load balancing. The microservice 406 may be configured to act as a reverse proxy such that it hides the server behind it (e.g., PBX server 408). The microservice 406 is configured to encode the binding request 414, based on the business logic, such that it is output as the binding request 416. The binding request 416 is encoded by the microservice 406 such that it can be decoded at the PBX server 408. The PBX server 408 may provide a Lua-based API for the third party application to enable communication between the PBX server 408 and the third party application. The binding request 416 may be an event socket request that is based on the binding request 414. The microservice 406 is configured to transmit the binding request 416, for example, as a transmission control protocol (TCP) request, to the PBX server 408 over a TCP connection. In some examples, the microservice 406 may validate the HTTPS request.

The PBX server 408 receives the binding request 416 and creates 418 a binding record in a database to indicate that a binding status between the client 402 and the client 412 is pending. The pending binding status indicates that the binding request 416 has been received, and the binding between the client 402 and the client 412 is not yet complete. Once the binding between the client 402 and the client 412 is completed, the binding status may be updated to indicate that the binding is active or connected. The binding record is created in response to receiving the binding request 416. The binding record may include the request ID, the controller device ID, the controlled device ID, the controller application ID, the controlled application ID, the account ID, the extension ID, the binding status, an extension domain, a registration name, a manufacturer name, a timestamp, or any combination thereof.

The PBX server 408 transmits a binding request 420 to the SBC 410. The binding request 420 may be included in a header of a SIP message, such as a SIP NOTIFY message. For example, the SIP message may be an out-of-dialog SIP NOTIFY message. The SBC 410 receives the binding request 420 and forwards the binding request 420 to the client 412. The client 412 receives the binding request 420 and confirms 422 the binding request 420. Confirming the binding request 420 may include matching an account ID or extension ID included in the SIP message with an account ID or extension ID of the client 412. In some examples, receiving the binding request 420 may cause the client 412 to display a prompt on a display of the client 412 or some other device. The prompt may request an input to confirm the binding. The input may be received via a user interface of the client 412 or some other device, such as user interface 212 shown in FIG. 2.

When the binding request 420 is confirmed, the client 412 transmits a binding result 424 to the SBC 410. The binding result 424 may be included in a header of a SIP message, such as a SIP INFO message. For example, the SIP message may be an out-of-dialog SIP INFO message. The header of the SIP message may also include the request ID, a controller device ID, a controlled device ID, a controller application ID, a controlled application ID, an account ID, an extension ID, an extension domain, a manufacturer name, a timestamp, or any combination thereof. The SBC 410 receives the binding result 424 and forwards the binding result 424 to the PBX server 408. The PBX server 408 receives the binding result 424 and updates 426 the binding record to indicate that the binding status is confirmed. The PBX server 408 transmits the binding result 428 to the microservice 406. The binding result 428 may be an HTTPS request that contains the binding result. The microservice 406 receives the binding result 428 and forwards the binding result 428 to the web server 404. The web server 404 receives the binding result 428 and forwards the binding result 428 to the client 402. In some examples, the client 402 may transmit a message to the web server 404 to confirm that the client 402 received the binding result 428. The web server 404 may transmit the message to the PBX server 408. In some examples, the web server 404 may transmit the message to the PBX server 408 via the microservice 406. The PBX server 408 may update the binding record to indicate that the binding is active or connected.

Figure 5:
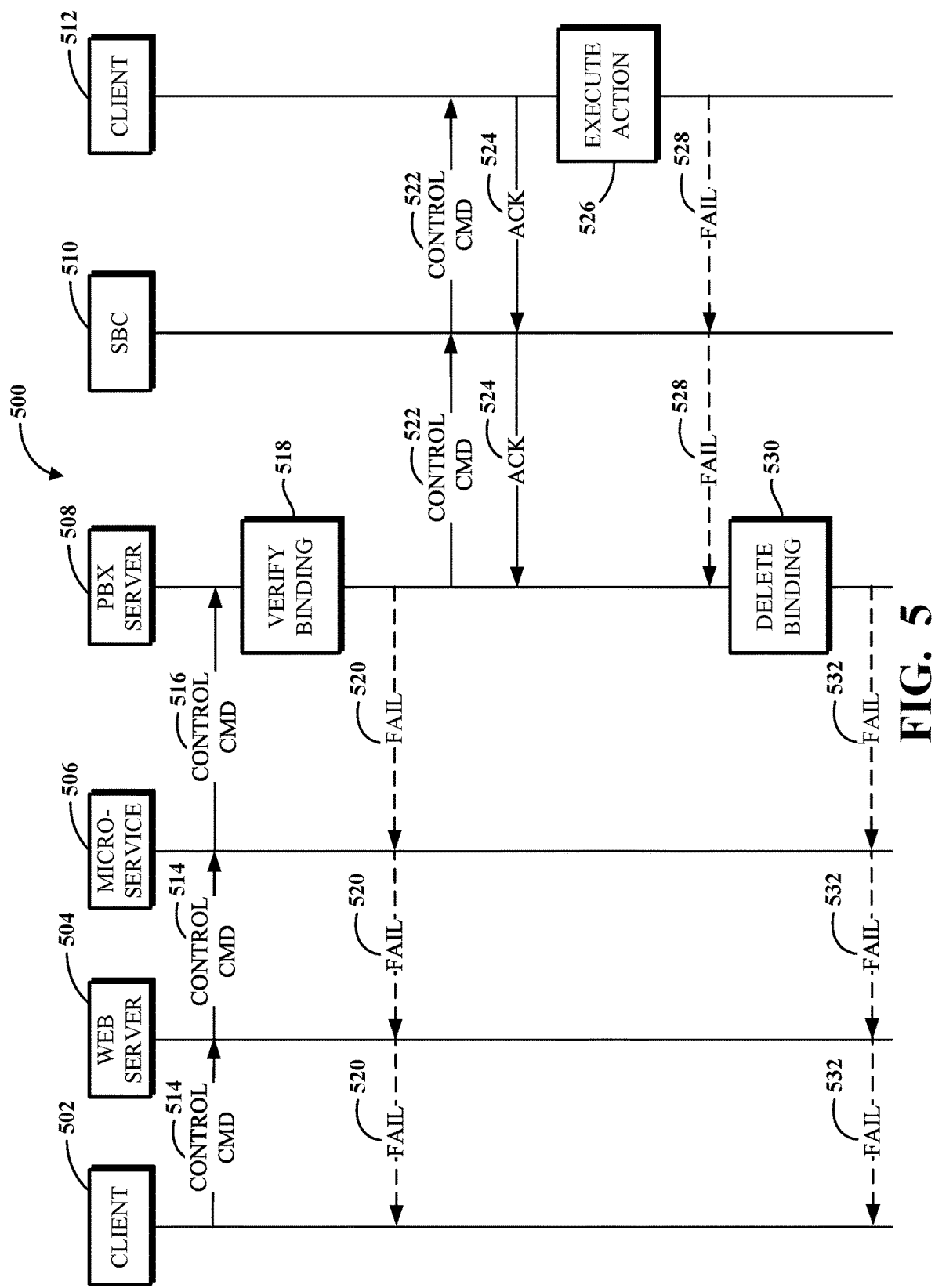
FIG. 5 is a block diagram of an example of a system configured for third party application control of a client.

FIG. 5 is a block diagram of an example of a system 500 configured for third party application control of a client. In this example, the system 500 is performing a call control action. The system 500 includes a client 502, a web server 504, a microservice 506, a PBX server 508, an SBC 510, and a client 512. The client 502 may be a client application such as a third party application, and the client 512 may be a client application or a client device, such as client 410 shown in FIG. 4. Example third party applications may include, and are not limited to, a CRM application, a social media application, or a messaging application.

In this example, the client 502 may be the controller application and the client 512 may be the controlled device. The client 502 is configured to transmit a control command 514 to control a function of the client 512. The control command 514 may be included in a header of an HTTPS message, such as an HTTPS request message. The header of the HTTPS message may also include a command ID, an action command, a controller device ID, a controlled device ID, a controller application ID, a controlled application ID, an account ID, an extension ID, an extension domain, a registration name, a manufacturer name, a timestamp, or any combination thereof. The web server 504 is configured to receive the control command 514 and forward the control command 514 to the microservice 506. The microservice 506 may be a microservice such as the microservice 406 shown in FIG. 4. The microservice 506 receives the control command 512 and encodes the control command 514, for example, based on business logic, such that the control command 514 is output as a control command 516. The control command 516 is encoded by the microservice 506 such that it can be decoded at the PBX server 508. The control command 516 may be an event socket message that is based on the control command 514. The microservice 506 is configured to transmit the control command 516 to the PBX server 508 over a TCP connection.

In response to receiving the control command 516, the PBX server 508 obtains a binding record from a database to verify 518 the binding status between the client 502 and the client 512. If the binding record indicates that a binding does not exist between the client 502 and the client 512, the PBX server 508 may transmit a failure indication 520 to the microservice 506 that indicates that the execution of the control command 516 has failed. The failure indication 520 may be an HTTPS request that contains the failure information. The microservice 506 receives the failure indication 520 and forwards the failure indication 520 to the web server 504. The web server 504 receives the failure indication 520 and forwards the failure indication 520 to the client 502.

If the binding record indicates that a binding exists between the client 502 and the client 512, the PBX server 508 transmits a control command 522 to the SBC 510. The control command 522 may be included in a header of a SIP message, such as a SIP NOTIFY message. For example, the SIP message may be an out-of-dialog SIP NOTIFY message. The header of the SIP message may also include a command ID, an action command, a controller device ID, a controlled device ID, a controller application ID, a controlled application ID, an account ID, an extension ID, an extension domain, a registration name, a manufacturer name, a timestamp, or any combination thereof. The SBC 510 receives the control command 522 and forwards the control command 522 to the client 512. The client 512 receives the control command 522 and transmits an ACK 524 to the SBC 510 to indicate that the client 512 has received the control command 522. The SBC 510 receives the ACK 524 and forwards the ACK 524 to the PBX server 508.

In response to receiving the control command 522, the client 512 may execute 526 an action. The action may be executed based on an action command indicated in the control command 522. The action may include, and is not limited to, initiating a call, performing a call transfer, adding a call, merging a call, placing a call on hold, controlling the volume of the client 510, or muting a microphone of the client 512.

If the client 512 fails to execute the action, the client 512 may transmit a failure indication 528 to the SBC 510. The failure indication 528 may be included in a header of a SIP message, such as a SIP INFO message. For example, the SIP message may be an out-of-dialog SIP INFO message. The SBC 510 receives the failure indication 528 and forwards it to the PBX server 508. In response to receiving the failure indication 528, the PBX server 508 may delete 530 the binding record in the database and transmit the failure indication 532 to the microservice 506. The failure indication 532 may be an HTTPS request that contains the failure information. The header may include a request for the client 502 to re-bind client 512. The microservice 506 receives the failure indication 532 and forwards it to the web server 504. The web server 504 receives the failure indication 532 and forwards it to the client 502.

Figure 6:
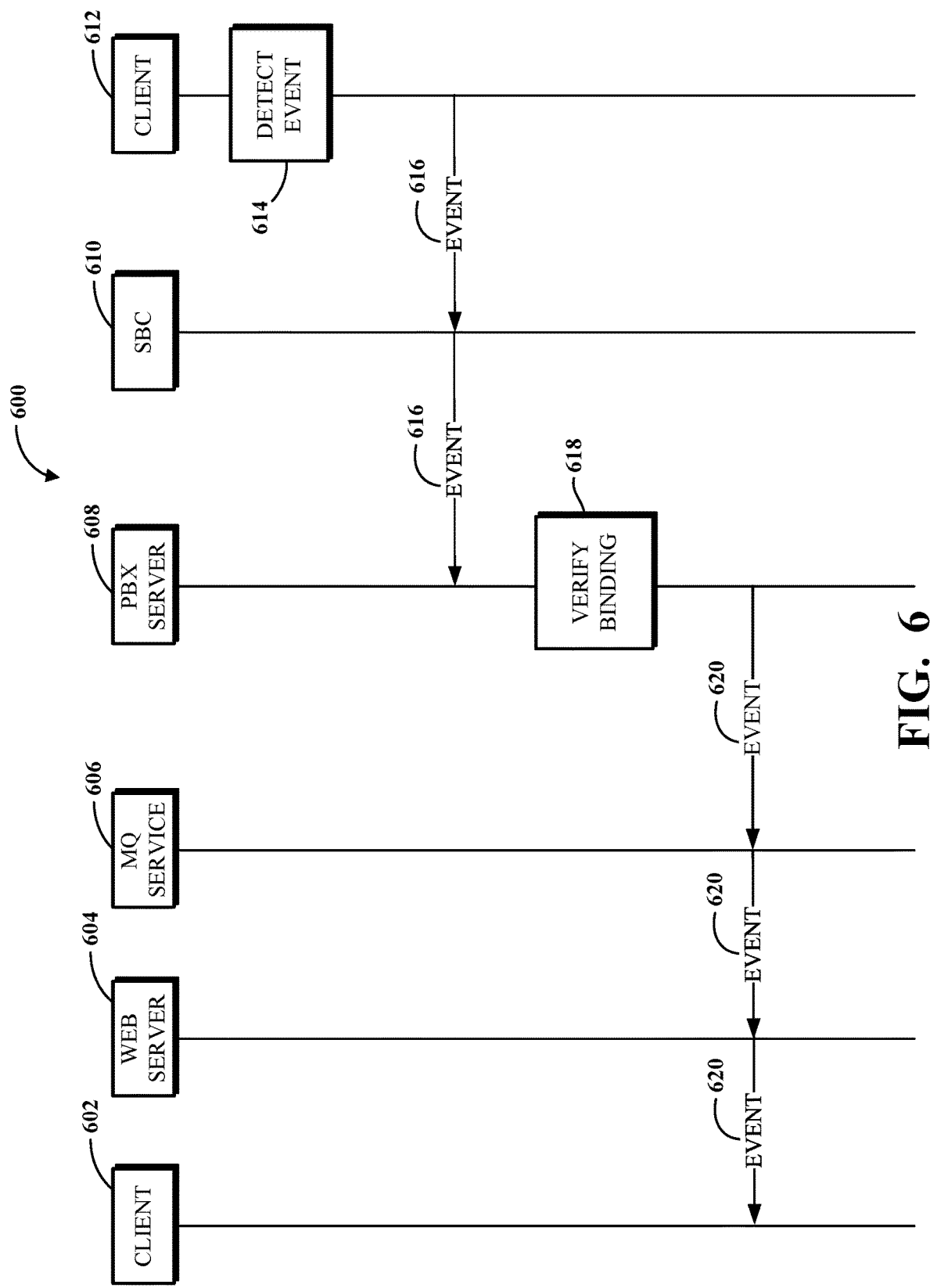
FIG. 6 is a block diagram of another example of a system configured for third party application control of a client.

FIG. 6 is a block diagram of another example of a system 600 configured for third party application control of a client. In this example, the system 600 is performing an event notification process. The system 600 includes a client 602, a web server 604, a message queue (MQ) service 606, a PBX server 608, an SBC 610, and a client 612. The client 602 may be a client application, such as a third party application, and the client 612 may be a client device, such as clients 402 and 410 shown in FIG. 4 or the clients 502 and 510 shown in FIG. 5, to the extent different. Example third party applications may include, and are not limited to, a CRM application, a social media application, or a messaging application.

In this example, the client 602 may be the controller application and the client 612 may be the controlled device. At some point, the client 612 detects 614 an event. The event may be a call state change, such as a ring, a call connection, or a call termination. The client 612 transmits an event notification 616 to the SBC 610 to notify the client 602 of the detected event. The event notification 616 may be included in a header of a SIP message, such as a SIP INFO message. For example, the SIP message may be an out-of-dialog SIP INFO message. The header of the SIP message may also include a command ID, an action command, a controller device ID, a controlled device ID, a controller application ID, a controlled application ID, an account ID, an extension ID, an extension domain, a registration name, a manufacturer name, a timestamp, or any combination thereof. The SBC 610 receives the event notification 616 and forwards the event notification 616 to the PBX server 608.

In response to receiving the event notification 616, the PBX server 608 obtains a binding record from a database to verify 618 the binding status between the client 602 and the client 612. If the binding record indicates that a binding exists between the client 602 and the client 612, the PBX server 608 transmits the event notification 620 to the MQ service 606. In an example, the MQ service may be an application running on a server, such as the application server 108 shown in FIG. 1. The MQ service may be an asynchronous MQ service configured to run on an Apache Kafka platform. The event notification 620 may be in a message format that is defined by the MQ service. The PBX server 608 may use an API provided by the MQ service to transmit the event notification 620. The event notification 620 may also include a command ID, an action command, a controller device ID, a controlled device ID, a controller application ID, a controlled application ID, an account ID, an extension ID, an extension domain, a registration name, a manufacturer name, a timestamp, or any combination thereof. The MQ service 606 receives the event notification 620 and forwards the event notification 620 to the web server 604. The web server 604 receives the event notification 620 and forwards the event notification 620 to the client 602.

To illustrate an example use case of the system 500 shown in FIG. 5, an example is presented where functionality of a third party application to control a desk phone would be desirable. This example relates to a contact list, in which the contact list is searched using the third party application and a call is conducted on the desk phone. Searching through a contact list using a desk phone can be cumbersome when the interface of the desk phone is limited (e.g., less usable than an interface of the third party application due to its limited search capabilities, complicated menu structures, and an awkward input interface of condensed keypads that makes searching for a contact difficult). In this example, a user may efficiently search contacts using the third party application, select a contact using the third party application, place a call to the selected contact using the third party application, and conduct the call on the desk phone. The user can provide an input using an interface of the third party application to place a call to the selected contact. A control command is transmitted based on the input. Upon verification of a binding between the third party application and the desk phone, the control command is transmitted to the desk phone. The desk phone may then place the call to the selected contact based on the control command.

Figure 7:
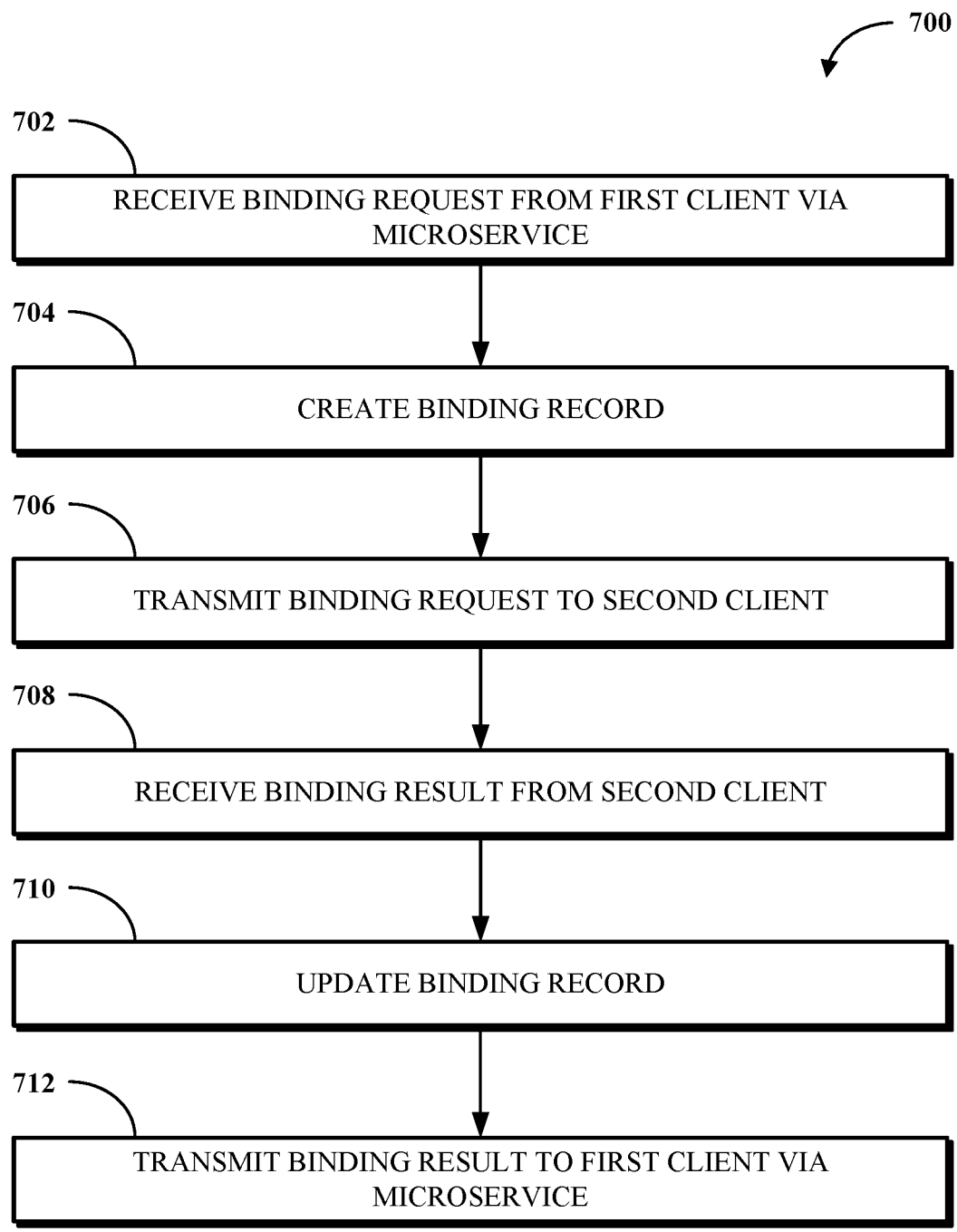
FIG. 7 is a flow diagram of an example of a method for performing a binding operation of a third party application with a client.
Figure 8:
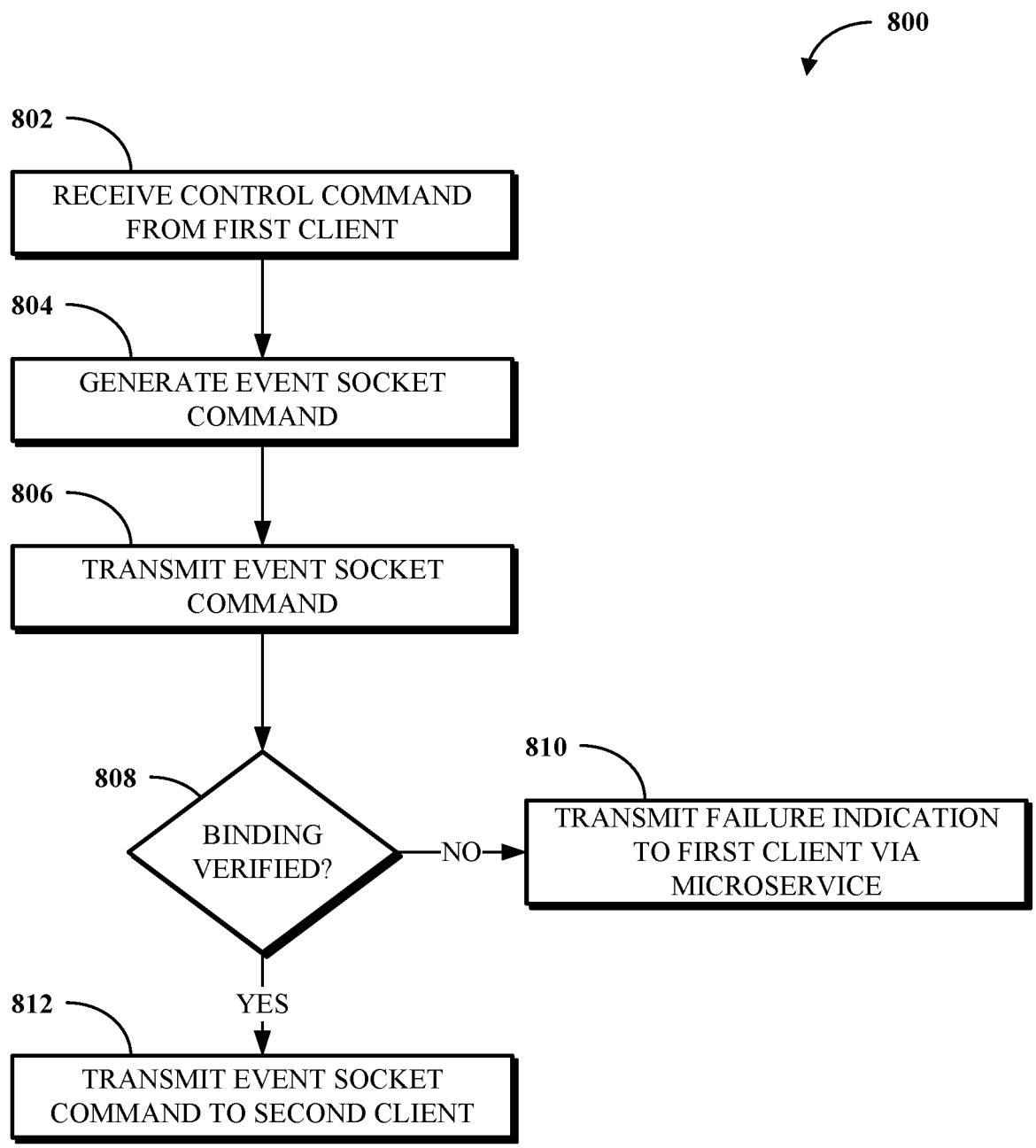
FIG. 8 is a flow diagram of an example of a method for third party application control of a client.

To further describe some implementations in greater detail, reference is next made to examples of methods that may be performed by or using a system for third party application control of a client. FIGS. 7 and 8 are a flowcharts examples of methods 700 and 800 for third party application control of a client. The methods 700 and 800 can be executed using computing devices, such as the systems, hardware, and software described with respect to FIGS. 1-6. The methods 700 and 800 can be performed, for example, by executing a machine-readable program or other computer-executable instructions, such as routines, instructions, programs, or other code. The steps, or operations, of the methods 700 and 800 or other techniques, methods, processes, or algorithms described in connection with the implementations disclosed herein can be implemented directly in hardware, firmware, software executed by hardware, circuitry, or a combination thereof.

For simplicity of explanation, the methods 700 and 800 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, a flow diagram of an example of the method 700 for performing a binding operation of a third party application with a client is shown. At 702, the method 700 includes receiving a binding request from a first client. The binding request may be received via a microservice. In this example, the first client may be a controller application attempting to form a binding with a second client to control one or more functions of the second client. The binding request may be an event socket request that is received over a TCP connection. The binding request may include a request ID, an action command, a controller device ID, a controlled device ID, a controller application ID, a controlled application ID, an account ID, an extension ID, an extension domain, a manufacturer name, a timestamp, or any combination thereof.

At 704, the method 700 includes creating a binding record. Creating the binding record includes storing the binding record in a database. The database may be an in-memory data structure store, such as a redis database. The binding record indicates a binding status between the first client and the second client and may include the request ID, the controller device ID, the controlled device ID, the controller application ID, the controlled application ID, the account ID, the extension ID, the binding status, an extension domain, a registration name, a manufacturer name, a timestamp, or any combination thereof. In this example, at this stage, the binding status may be indicated as pending.

At 706, the method 700 includes transmitting the binding request to the second client. In some examples, the binding request may be transmitted to the second client via an SBC. The binding request may be included in a header of a SIP message, such as a SIP NOTIFY message. For example, the SIP message may be an out-of-dialog SIP NOTIFY message.

At 708, the method 700 includes receiving a binding result from the second client. In some examples, the binding result may be received via an SBC. The binding result may be included in a header of a SIP message, such as a SIP INFO message. For example, the SIP message may be an out-of-dialog SIP INFO message. The header of the SIP message may also include the request ID, a controller device ID, a controlled device ID, a controller application ID, a controlled application ID, an account ID, an extension ID, an extension domain, a manufacturer name, a timestamp, or any combination thereof.

At 710, the method 700 includes updating the binding record. For example, the binding record may be updated to indicate that the binding status is confirmed or connected. In an example where the binding operation failed, the binding record may be updated to indicate the binding status as failed.

At 712, the method 700 includes transmitting the binding result to the first client to notify the first client of the binding status. In some examples, the binding result may be transmitted via an SBC. The binding result may be included in an HTTPS request.

In an example, a binding may be created between the first client and the second client via a third party application. The third party application may be running on the first client or the second client. In an example where the third party application is running on the first client, the binding may be created by entering or scanning a device-specific code associated with the second client. Entering or scanning the device-specific code using the first client may trigger the transmission of the binding request by the first client. In an example where the application is running on the second client, the binding may be created by entering or scanning a device-specific code associated with the first client. In some examples, a third party application running on the first device may display a device-specific code. The device-specific code may be entered or scanned using the second client, which in turn may trigger the transmission of the binding request by the second client.

Referring next to FIG. 8, a flow diagram of an example of the method 800 for third party application control of a client is shown. In this example, a first client, such as a third party application, may be attempting to control one or more functions of a second client. At 802, the method 800 includes receiving a control command from the first client. The control command may be an HTTPS message, such as an HTTPS request. The HTTPS message may include a command ID, an action command, a controller device ID, a controlled device ID, a controller application ID, a controlled application ID, an account ID, an extension ID, an extension domain, a registration name, a manufacturer name, a timestamp, or any combination thereof.

At 804, the method 800 includes generating an event socket command. The event socket command may be generated based on the control command using an ESL. Generating the event socket command may include executing business logic based on the control command.

At 806, the method 800 includes transmitting the event socket command. The event socket command may be transmitted to a PBX server over a TCP connection.

At 808, the method 800 includes determining whether a binding is verified. Determining whether a binding is verified may include obtaining a binding record from a database to verify the binding status between the first client and the second client. If it is determined at 810 that a binding cannot be verified, and therefore a binding does not exist between the first client and the second client, the method 800 includes transmitting a failure indication to the first client at 808 via a microservice. The failure indication indicates that the execution of the control command has failed. The failure indication may be included in an HTTPS request.

If it is determined at 808 that a binding is verified, and therefore a binding between the first client and second client exists, the method 800 includes transmitting the event socket command to the second client at 812. In some examples, the event socket command may be transmitted via an SBC. The event socket command may be included in a header of a SIP message, for example, a SIP NOTIFY message. The SIP NOTIFY message may be an out-of-dialog SIP NOTIFY message.

In some implementations, a shared control mode can be used to enable bi-directional control of clients across the software platform. Bi-directional control of clients may be enabled by creating a binding between clients across the software platform. In an example where a binding has been created between a third party application and a desk phone, the third party application may be used to change a setting on the desk phone, such as a ringtone or a background image, for example. In this example, the binding may also enable a device running the third party application to be used as an audio source for a conference. Shared control mode can be used to enable bi-directional control such that the desk phone may be used to update the third party application. In an example where the third party application is a CRM, the desk phone may receive a call from a caller that is not a contact in the CRM. The desk phone may be used to create a new contact in the CRM or update an existing contact. In shared control mode, the client that acts as a controller transmits the control command. In this example, the device running the third party application may transmit a control command to change the desk phone setting, and the desk phone may transmit a control command in response to a button press to create a new contact in the CRM or update an existing contact.

In an aspect, a method may include receiving a control command from a first client. The first client may be associated with a third party application configured to run on a software platform. The control command may indicate a function for a second client to perform. The second client may be associated with the software platform. The method may include generating an event socket command based on the control command. The method may include transmitting the event socket command to a PBX server of the software platform over a TCP connection. The method may include determining, by the PBX server, a binding status indicating a binding between the first client and the second client. The method may include transmitting the event socket command to the second client to perform the function based on the binding status.

In an aspect, a system may include a PBX server. The system may include a server that comprises a microservice. The microservice may be configured to receive a control command from a first client associated with a third party application configured to run on a software platform. The control command may indicate a function for a second client to perform, the second client may be associated with the software platform. The microservice may be configured to generate an event socket command based on the control command. The microservice may be configured to transmit the event socket command to the PBX server over a TCP connection. The PBX server may be configured to determine a binding status indicating a binding between the first client and the second client. The PBX server may be configured to transmit the event socket command to the second client to perform the function based on the binding status.

In an aspect, a non-transitory computer-readable medium may comprise instructions stored on a memory, that when executed by a processor, cause the processor to perform operations. The operations may include receiving a control command from a first client associated with a third party application configured to run on a software platform. The control command may indicate a function for a second client to perform. The second client may be associated with the software platform. The operations may include generating an event socket command based on the control command. The operations may include transmitting the event socket command to a PBX server of the software platform over a TCP connection. The operations may include determining, by the PBX server, a binding status indicating a binding between the first client and the second client. The operations may include transmitting the event socket command to the second client to perform the function based on the binding status.

One or more aspects may include receiving an indication of a call status change from the second client. One or more aspects may include obtaining the binding status from a database responsive to the indication. One or more aspects may include transmitting the indication to the first client when the binding status indicates the binding between the first client and the second client. In one or more aspects, the control command may include a header that includes an action command associated with the function of the second client. In one or more aspects, the control command may include a header that includes a controller device identifier associated with the first client. In one or more aspects, the control command may include a header that includes a controlled device identifier associated with the second client. In one or more aspects, the control command may be an HTTPS request. In one or more aspects, the third party application may be a CRM application, a social media application, or a messaging application. One or more aspects may include initiating a call from the first client, wherein the call is conducted via the second client. In one or more aspects, the second client may be a desk phone. In one or more aspects, the function to be performed by the desk phone may be to change a speaker volume of the desk phone, place a call on hold, resume the call, transfer the call, mute the call, unmute the call, terminate the call, or merge the call with another call. In one or more aspects, the event socket command may be generated using an event socket library that comprises socket information to enable the third party application to communicate with the PBX server. In one or more aspects, the event socket command may be transmitted to the second client as a SIP message.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving a control command from a first client associated with a third party application configured to run on a software platform, the control command indicating a function for a second client to perform, the second client associated with the software platform, wherein the first client and the second client are connected to a cloud-based communication system based on a telephony extension;
generating an event socket command based on the control command;
transmitting the event socket command to a private branch exchange (PBX) server of the software platform over a transmission control protocol (TCP) connection;
determining, by the PBX server, a binding status from a database indicating an existence of a wireless binding between the first client and the second client, wherein the wireless binding is an association between the first client and the second client based on the first client and the second client sharing a user account, and enables shared control of the second client via the third party application; and
transmitting the event socket command to the second client to execute the function based on the binding status indicating the existence of the wireless binding between the first client and the second client, wherein the wireless binding between the first client and the second client is based on a multi-step confirmation received from the first client and the second client, and wherein the multi-step confirmation includes creating a binding record and updating the binding record.

2. The method of claim 1, comprising:
receiving an indication of a call status change from the second client;
obtaining the binding status from a database responsive to the indication; and
transmitting the indication to the first client when the binding status indicates the wireless binding between the first client and the second client.

3. The method of claim 1, wherein the control command includes a header that includes an action command associated with the function of the second client, the control command includes a header that includes a controller device identifier associated with the first client, the control command includes a header that includes a controlled device identifier associated with the second client, or the control command is a hypertext transfer protocol over secure socket layer (HTTPS) request.

4. The method of claim 1, wherein the third party application is a customer relationship management (CRM) application, a social media application, or a messaging application.

5. The method of claim 1, further comprising:
initiating a call from the first client, wherein the call is conducted via the second client.

6. The method of claim 1, wherein the second client is a desk phone, and wherein the function to be performed by the desk phone is to change a speaker volume of the desk phone, place a call on hold, resume the call, transfer the call, mute the call, unmute the call, terminate the call, or merge the call with another call.

7. The method of claim 1, wherein the event socket command is generated using an event socket library that comprises socket information to enable the third party application to communicate with the PBX server.

8. The method of claim 1, wherein the event socket command is transmitted to the second client as a session initiation protocol (SIP) message.

9. A system, comprising:
a private branch exchange (PBX) server comprising a non-transitory computer-readable medium comprising stored instructions; and
a server comprising a non-transitory computer-readable medium comprising stored instructions configured to:
receive a control command from a first client associated with a third party application configured to run on a software platform, the control command indicating a function for a second client to perform, the second client associated with the software platform, wherein the first client and the second client are connected to a cloud-based communication system based on a telephony extension;
generate an event socket command based on the control command; and
transmit the event socket command to the PBX server over a transmission control protocol (TCP) connection;
the PBX server configured to:
determine a binding status from a database that indicates an existence of a wireless binding between the first client and the second client, wherein the wireless binding is an association between the first client and the second client based on the first client and the second client sharing a user account, and enables shared control of the second client via the third party application; and
transmit the event socket command to the second client to execute the function based on the binding status that indicates the existence of the wireless binding between the first client and the second client, wherein the wireless binding between the first client and the second client is based on a multi-step confirmation received from the first client and the second client, and wherein the multi-step confirmation includes creation of a binding record and an update of the binding record.

10. The system of claim 9, wherein the PBX server is further configured to:
receive an indication of a call status change from the second client;
obtain the binding status from a database responsive to the indication; and
transmit the indication to the first client when the binding status indicates the wireless binding between the first client and the second client.

11. The system of claim 9, wherein the control command includes a header that includes an action command associated with the function of the second client, the control command includes a header that includes a controller device identifier associated with the first client, the control command includes a header that includes a controlled device identifier associated with the second client, or the control command is a hypertext transfer protocol over secure socket layer (HTTPS) request.

12. The system of claim 9, wherein the third party application is a customer relationship management (CRM) application, a social media application, or a messaging application.

13. The system of claim 9, wherein the second client is a desk phone, and wherein the function to be performed by the desk phone is to change a speaker volume of the desk phone, place a call on hold, resume the call, transfer the call, mute the call, unmute the call, terminate the call, or merge the call with another call.

14. The system of claim 9, wherein the event socket command is generated using an event socket library that comprises socket information to enable the third party application to communicate with the PBX server.

15. The system of claim 9, wherein the event socket command is transmitted to the second client as a session initiation protocol (SIP) message.

16. A non-transitory computer-readable medium comprising instructions stored on a memory, that when executed by a processor, cause the processor to perform operations comprising:
receiving a control command from a first client associated with a third party application configured to run on a software platform, the control command indicating a function for a second client to perform, the second client associated with the software platform, wherein the first client and the second client are connected to a cloud-based communication system based on a telephony extension;
generating an event socket command based on the control command;
transmitting the event socket command to a private branch exchange (PBX) server of the software platform over a transmission control protocol (TCP) connection;
determining, by the PBX server, a binding status from a database indicating an existence of a wireless binding between the first client and the second client, wherein the wireless binding is an association between the first client and the second client based on the first client and the second client sharing a user account, and enables shared control of the second client via the third party application; and
transmitting the event socket command to the second client to execute the function based on the binding status indicating the existence of the wireless binding between the first client and the second client, wherein the wireless binding between the first client and the second client is based on a multi-step confirmation received from the first client and the second client, and wherein the multi-step confirmation includes creating a binding record and updating the binding record.

17. The non-transitory computer-readable medium of claim 16, wherein the processor is further configured to perform operations comprising:
receiving an indication of a call status change from the second client;
obtaining the binding status from a database responsive to the indication; and
transmitting the indication to the first client when the binding status indicates the wireless binding between the first client and the second client.

18. The non-transitory computer-readable medium of claim 16, wherein the control command includes a header that includes an action command associated with the function of the second client, the control command includes a header that includes a controller device identifier associated with the first client, the control command includes a header that includes a controlled device identifier associated with the second client, or the control command is a hypertext transfer protocol over secure socket layer (HTTPS) request.

19. The non-transitory computer-readable medium of claim 16, wherein the third party application is a customer relationship management (CRM) application, a social media application, or a messaging application.

20. The non-transitory computer-readable medium of claim 16, wherein the second client is a desk phone, and wherein the function to be performed by the desk phone is to change a speaker volume of the desk phone, place a call on hold, resume the call, transfer the call, mute the call, unmute the call, terminate the call, or merge the call with another call.

\* \* \* \* \*